Oct. 13, 1953     H. J. JÖRGENSEN     2,654,976
REGULATING VALVE FOR REFRIGERATING INSTALLATIONS
Filed Jan. 28, 1950
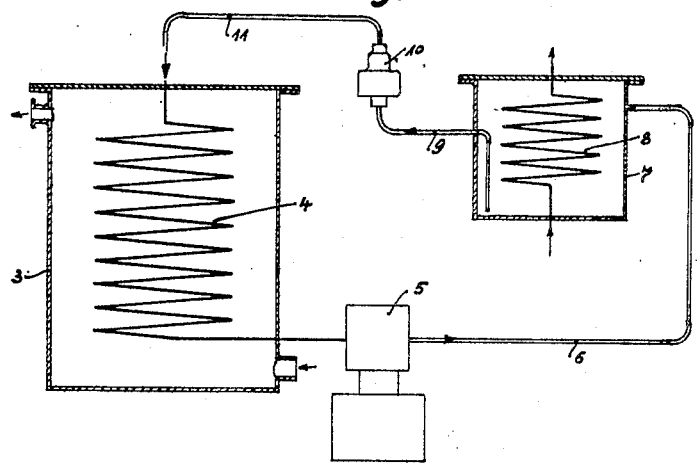
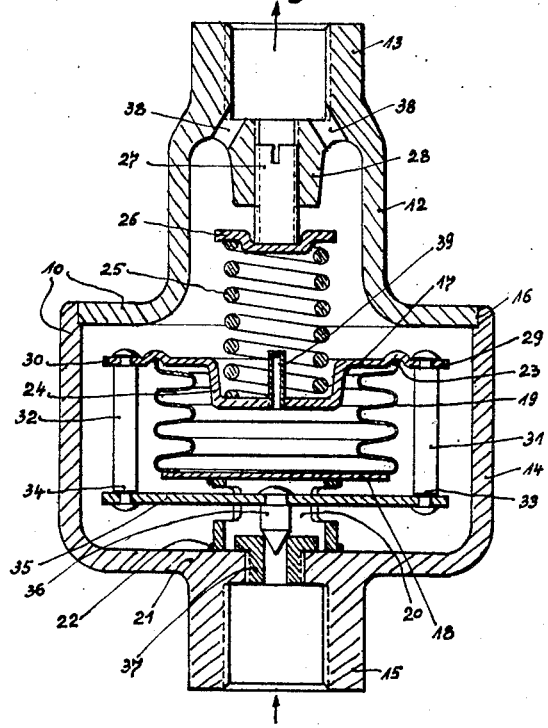
Inventor:
HANS JORGEN JÖRGENSEN
By: Haseltine, Lake & Co.
AGENTS Patented Oct. 13, 1953

2,654,976

UNITED STATES PATENT OFFICE 2,654,976

REGULATING VALVE FOR REFRIGERATING INSTALLATIONS

Hans Jörgen Jörgensen, Hamburg-Stellingen, Germany

Application January 28, 1950, Serial No. 141,027
In Germany February 2, 1949

3 Claims. (Cl. 50—21)

This invention relates to regulating valves for refrigerating installations of the type in which the refrigerating medium is a liquid which is alternately evaporated or gasified and re-condensed. In these known refrigerating installations, a readily evaporating liquid, for example methyl chloride ($CH_3Cl$), is evaporated in a tube system at a predetermined temperature and at its saturation pressure while absorbing latent heat from the element by which it is surrounded. The vapours formed are sucked in by a compressor and brought to a pressure at which they are re-condensed in a condenser while yielding latent heat to cooling water or air at a corresponding saturation temperature. The liquid thus obtained passes, after reaching substantially the same temperature as the cooling water of the condenser, through a regulating throttle valve, which forms the subject of the present invention, into an evaporator, from which it recommences the cycle.

Regulating and expansion valves for refrigerating installations of the aforesaid type have the object of enabling the liquid subjected to pressure in the condenser to expand to a lower pressure and of maintaining a constant pressure beyond the regulating valve. The pressure in the regulating valve is regulated by a corrugated tube which is compressed by the pressure in the evaporator and cuts off the valve at a predetermined pressure corresponding to the cooling medium. The cut-off member employed is a needle or valve cone co-operating with a nozzle.

The construction of known regulating valves for refrigerating installations is such that the corrugated tube has only the bottom end on which the gas pressure can act, the other end of the corrugated tube being in communication with the external air. In this known construction, the valve nozzle is closed in the direction of the corrugated tube. In order to make this possible, however, a connecting rod must be extended through the nozzle to the valve cone. In another known form of construction, the valve cone is rigidly connected to the bottom end of the corrugated tube by special guide links and a special by-pass passage to the interior of the valve body must be provided. Both these known regulating valves are of complicated design and are extremely difficult to construct because the valve cone is arranged outside that part of the housing in which the corrugated tube is situated.

The invention relates to a regulating valve for refrigerating installations, in which the aforesaid disadvantages are simply overcome by reason of the fact that the corrugated tube, or other similarly fashioned hollow element, which takes up the pressure of the refrigerating medium, is constructed as a closed container and serves as a support for the valve cone.

Due to this construction, the corrugated tube is situated in a space hermetically sealed from the atmosphere, and the gas pressure entering the valve body can act on the surface of the corrugated tube from all sides, whereby the valve cone is automatically adjusted during operation in accordance with the existing pressure conditions, which is not the case with the known valves.

In accordance with an advantageous embodiment of the invention, that end of the corrugated tube which lies nearer the valve needle or valve cone is rigidly connected to the valve housing, while the other end of the corrugated tube is movable and serves as a control member for the valve needle or valve cone. Due to this arrangement, the valve cone closes the gas-inlet nozzle when the corrugated tube is compressed, that is to say, when it moves in the direction of the said nozzle. By-passing of the nozzle or the passing of a valve rod through the nozzle is avoided.

The pressure on the valve cone for cutting off the passage of the refrigerating medium into the valve body may, in accordance with a preferred embodiment of the invention, be regulated by means of a spring which at the same time acts on the corrugated tube. The expansion capacity of the spring can be adjusted by means of an adjusting screw. In order to increase the sensitivity of the valve, the corrugated tube may, in accordance with the invention, be filled with a gas under pressure, the pressure being slightly higher than the required operating pressure surrounding the corrugated tube. The gas with which the corrugated tube is filled may be air or any other gas. Due to the super-pressure in the corrugated tube, a counter-pressure is set up for the spring acting on the corrugated tube, such that the spring may be made very weak, whereby the sensitivity of the valve is increased.

An embodiment of the invention is illustrated by way of example in the accompanying drawings, in which:

Fig. 1 is a diagrammatic view of a refrigerating installation, in which a valve according to the invention is employed, and Fig. 2 is a vertical section through the regulating valve.

The refrigerating installation according to Fig. 1 comprises an evaporator 3, in which a tubular coil 4 is arranged. The tubular coil 4 is traversed by the gaseous refrigerating medium, which is sucked up by means of a compressor 5 and delivered through a pipe 6 into a condenser 7. The condenser 7 contains a tubular coil 8 through which cooling water is passed and by means of which the refrigerating medium is cooled and converted into the liquid condition in order to be fed in this condition through a pipe 9 to a regulating valve 10. On admission into the regulating valve, the refrigerating medium or cooling vehicle is converted back into the gaseous condition by pressure differences. The regulating valve 10 forms the subject of the present invention.

The regulating valve 10 reduces the pressure of the refrigerating medium, for example, from 4 atmospheres super-pressure to 0.8 atmosphere super-pressure and reduces its temperature to about −10° C. The refrigerating medium passes in this condition from the regulating valve 10 through a pipe 11 into the tubular coil 4 of the evaporator 3. A temperature exchange here takes place between the refrigerating medium and the brine or the atmosphere, so that the refrigerating medium leaves the tubular coil 4, which is connected to the compressor 5, at a temperature of about +5° C. The compressor 5 sucks the refrigerating medium in the gaseous condition from the tubular coil 4 and again delivers it into the pipe 6, whereafter the cycle is recommenced.

The valve housing 10 (Fig. 2) consists of an upper portion 12 with an outlet branch 13, through which the expanded refrigerating medium is delivered to the evaporator in gaseous form, and a lower portion 14 having an inlet branch 15 for the cooling liquid. The upper portion 12 is connected detachably but in air-tight fashion to the lower portion 14 at 16. A corrugated tube 19 provided with a cover 17 and a base 18 is arranged in the lower portion 14. The base 18 is rigidly connected by a tubular distance piece 20 to the base 21 of the lower valve portion 14 at 22, for example by soldering. The cover 17 is connected in air-tight fashion, for example by soldering, to the corrugated tube 19 at 23. The cover 17 has a recess 24 concentric in relation to the corrugated tube 19, in which recess one end of a coil spring 25 is lodged. The said coil spring acts as a pressure spring, and the expansion capacity thereof may be regulated or adjusted with the aid of an interposed disc 26 by means of a screw 27 screwed into a web portion 28 arranged concentrically in relation to the upper portion 12 of the valve and to the corrugated tube 19, the web portion 28 forming part of the upper portion 12 of the valve.

The cover 17 of the corrugated tube 19 is provided with two lugs 29, 30 disposed diametrically opposite to one another, which project beyond the flange 23 by which the cover 17 is secured to the corrugated tube 19. A retaining bolt 31 is rigidly secured to the lug 29, while a retaining bolt 32 is rigidly secured to the lug 30. The free ends 33, 34 of the retaining bolts 31, 32 are rigidly connected together by a cross-piece 35 disposed below the base 18 and extending through suitable apertures formed in the tubular distance piece or spacer 20. A valve cone 36 is rigidly secured on the central axis of the valve housing to the cross-piece 35, and co-operates with a nozzle or seat 37 arranged in the base of the lower portion of the valve housing.

At the point at which the upper portion 12 of the housing is connected to the web portion 28, perforations 38 are formed, through which the expanded refrigerating medium can leave the valve housing.

The refrigerating liquid passes through the inlet branch 15 and the nozzle 37 when the valve cone 36 is in the open position, into the valve body 10, in which it expands at the valve cone 36, thus becoming gaseous and producing the pressure reductions required to reduce temperature. The expanded refrigerating medium leaves the valve body through the perforations 38 and the outlet branch 13 and thence passes to the evaporator. The screw 27 is provided for the adjustment of the expansion capacity of the spring 25 to the required pressure corresponding to the expanding refrigerating medium.

In order to produce a counter-pressure for the spring 25, the corrugated tube 19, fashioned as a closed container, may be filled with air or any other gas under pressure. The pressure in the container 19 is made slightly higher than the operating pressure in the valve housing 10. Consequently, the spring acting on the corrugated tube may be made very weak, whereby the sensitivity of the valve is substantially increased. A further advantage resides in the fact that the corrugated tube is substantially relieved of pressure, which contributes to a longer life. The gas with which the corrugated tube 19 is filled is introduced through a tube 39, which is sealed off, for example by soldering, when the filling is completed.

I claim:

1. For use in refrigerating installations; a regulating valve comprising a valve casing having inlet and outlet openings, said inlet opening having a valve seating, a movable valve member for controlling the flow through said valve seating, and means for displacing said movable valve member including a closed corrugated container disposed within said valve casing and having an interior which is completely free of parts, spring means acting on said corrugated container, means rigidly connecting one wall of said corrugated container to said casing, a second wall of said corrugated container being free to move relative to said valve casing, and bridging means connecting said second wall of the corrugated container to said movable valve member so that the latter is displaced to open and close said inlet opening in response to the pressure in said valve casing.

2. For use in refrigerating installations; a regulating valve according to claim 1, wherein said one wall of the corrugated container is spaced from said inlet opening of the valve casing and from said bridging means, and said movable valve member is located between said one wall of the corrugated container and said inlet opening of the valve casing.

3. For use in refrigerating installations; a regulating valve according to claim 1, wherein said corrugated container is of tubular configuration and arranged concentrically within said valve casing, and said one wall of the corrugated container is at the end of the latter closest to said inlet opening; and wherein said means rigidly connecting said one wall to said casing includes a tubular spacer having apertures in the sides thereof and spacing said one wall from said inlet opening, and said bridging means includes a cross-piece extending transversely through said apertures of the tubular spacer and carrying said movable valve member and elongated members disposed outside of said corrugated container and rigidly connecting said crosspiece to said second movable wall at the other end of the corrugated container.

HANS JÖRGEN JÖRGENSEN.

References Cited in the file of this patent

UNITED STATES PATENTS

| Number | Name | Date |
|---|---|---|
| 339,757 | Fulton | Apr. 13, 1886 |
| 1,818,061 | Holley | Aug. 11, 1931 |
| 1,916,635 | Pepper | July 4, 1933 |
| 2,094,908 | Throll | Oct. 5, 1937 |
| 2,212,709 | Grove | Aug. 27, 1940 |
| 2,312,063 | Allen | Feb. 23, 1943 |
| 2,381,358 | Marshall | Aug. 7, 1945 |
| 2,441,088 | Teague | May 4, 1948 |